United States Patent [19]

van der Smissen

[11] Patent Number: 4,636,485

[45] Date of Patent: Jan. 13, 1987

[54] FILTER COMPRISING A CATALYST ON A SUBSTRATE FOR PURIFICATION OF AIR

[75] Inventor: Carl-Ernst van der Smissen, Lubeck, Fed. Rep. of Germany

[73] Assignee: Drägerwerk AG, Fed. Rep. of Germany

[21] Appl. No.: 701,102

[22] Filed: Feb. 13, 1985

[30] Foreign Application Priority Data

Feb. 14, 1984 [DE] Fed. Rep. of Germany ....... 3405100

[51] Int. Cl.$^4$ .......................... B01J 21/04; B01J 21/08; B01J 21/18
[52] U.S. Cl. ........................................ 502/66; 502/181; 502/182; 502/183; 502/184; 502/185; 502/224; 502/226; 502/230; 502/241; 502/243; 502/245; 502/253; 502/307; 502/313; 502/314; 502/315
[58] Field of Search .............. 502/228, 329, 527, 181, 502/241, 243, 182, 183, 184, 185, 224, 226, 230, 324, 327, 330, 331, 245, 253, 256, 259, 66, 307, 313, 314, 315; 423/213.5, 247; 252/189; 422/177

[56] References Cited

U.S. PATENT DOCUMENTS

| | | |
|---|---|---|
| 3,956,459 | 5/1976 | Whitman et al. ................. 423/213.5 |
| 4,005,177 | 1/1977 | Weidenbach et al. ............ 423/213.5 |
| 4,012,485 | 3/1977 | Meguerian et al. .............. 423/213.5 |
| 4,366,668 | 1/1983 | Madgavkar et al. ........... 423/247 X |
| 4,492,770 | 1/1985 | Blanchard et al. .......... 423/213.5 X |

FOREIGN PATENT DOCUMENTS

292701 1/1971 U.S.S.R. .............................. 502/228

Primary Examiner—W. J. Shine
Attorney, Agent, or Firm—McGlew and Tuttle

[57] ABSTRACT

Pt catalyst on a substrate provides an air purification particularly for carbon oxide contained in the inhaled air is caused to react with air oxygen on the surface of carbon oxide catalysts and thus removed. But it is desirable for many air filter applications to eliminate, in addition to CO, other harmful gases from the air also. The Pt catalyst used as gaskmask filter material offers, particularly, but little protection additionally against acid gases. Due to an additional impregnation with the oxides of amine-forming heavy metals, the separating powers for acid gases is increased extraordinarily without reducing the capability of the Pt catalyst to oxidize CO catalytically. There even results an intensification of the respective effectiveness.

2 Claims, No Drawings

FILTER COMPRISING A CATALYST ON A SUBSTRATE FOR PURIFICATION OF AIR

FIELD AND BACKGROUND OF THE INVENTION

This invention relates in general to construction of air filters and in particular to a new and useful air filter for use in respirators.

The invention relates generally to a Pt catalyst on a substrate as air purification means for use in air filters. A similar air purification means is known from the ASME publication of the American Society of Mechanical Engineers, issue 77-ENAs-28. There, platinum metals on substrate materials catalyze the transformation of CO with air oxygen. This property is utilized on granulated substrates containing platinum metal as filter medium for CO filters. For many air filter applications it is desirable, however, to remove, besides CO, from the air other harmful gases also. But the CO filters containing platinum metal and having become known to date represent no or only little protection, particularly against acid gases like chlorine, hydrogen cyanide, hydrogen sulfide and similar gases. If a filter, such as a gas mask filter, heretofore was supposed to offer at the same time protection against acid gases and Co, it had to contain two different filter media. The one filter medium was effective for the separation of the acid gases, the other was a CO oxidation catalyst. Such gas mask filters are very big, heavy and cumbersome to handle.

SUMMARY OF THE INVENTION

The invention provides a Pt catalyst on a substrate as an air purification means for use in air filters so that a single-layer and, hence, smaller and lighter filter filling becomes possible, which is effective against CO and against acid gases also.

According to the invention, this problem is solved in that the substrate is impregnated with oxides of amine-forming heavy metals. The embodiment of the invention provides for the amine-forming heavy metal to be either zinc or copper. In further development there may be present, in addition, a heavy metal salt which then is a chromic acid salt or a chloride.

The advantages achieved by the invention are in particular that the Pt catalysts with the oxides of amine-forming heavy metals such as zinc oxide or copper oxide become, additionally, highly active for the separation of acid gases. The capability to catalyze CO oxidation, produced by the use of the platinum metals on the substrate, is not disturbed thereby. While double impregnations often lead to a reduction of the separating powers of each one of the two individual impregnations, they do not disturb here the platinum metal impregnation and the oxide impregnation. On the contrary, both impregnations result in an intensification of the respective effectiveness.

Accordingly, it is an object of the invention to provide an improved air filter comprising a Pt catalyst on a substrate which is impregnated with oxides of amine forming heavy metals.

DESCRIPTION OF THE PREFERRED EMBODIMENTS

A Pt catalyst according to the invention is constructed as follows:

A granulated, porous substrate of activated charcoal, activated alumina, silica gel or zeolite supports a layer of an oxide of an amine-forming metal such as zinc, copper, cobalt, nickel, silver or manganese on which there is platinum, palladium, rhodium or ruthenium. The platinum metals may be on the first oxide layer in elementary form, as oxide or as salt, e.g. as chloride. Depending on the moisture content of the substrate, the platinum metals are differently effective in the various forms. If the substrate is very dry, the elementary platinum metals are especially effective. At medium moisture content, a certain percentage of platinum metal oxide will increase the effectiveness, while at high moisture contents an addition of platinum metal chloride will have an advantageous effect. In practical use it will be attempted, therefore, to obtain platinum metals in all three forms on the substrate. It may also be advantageous, for the attainment of special gas separation powers, to apply to the substrate also metal salts such as chloride or chromate, in addition to the metal oxides.

Construction and production of an air purification medium according to the invention will now be explained by way of an example:

Activated charcoal is impregnated with an aqueous solution of zinc nitrate so that there are on the charcoal 10% by weight zinc. The impregnated charcoal is dried in vacuum and then heated to 200° C. so as to convert the zinc nitrate into zinc oxide. The activated charcoal containing zinc oxide is now impregnated with an aqueous palladium chloride solution so that 0.5% by weight palladium is on the charcoal. The impregnated charcoal is dried and then treated with a much diluted hydrazine solution. After reduction of about half the palladium chloride on the charcoal, the hydrazine solution is sucked off in vacuum at 50° C. The filter medium is brought into equilibrium with 80% relative humidity so that the water content does not materially change in practical use. The separating powers of the finished filter medium for chlorine, hydrogen cyanide, hydrogen sulfide and sulfur dioxide is excellent, and it effects the complete oxidation of CO at concentrations as low as a few ml CO per $m^3$ air as well as at high concentrations of 1.0% and 1.5% CO.

What is claimed is:

1. A filter for filtering air comprising a granulated porous substrate selected from the group consisting of activated charcoal, activated alumina, silica gel and zeolite, said substrate supporting a layer of an oxide of a metal selected from the group consisting of zinc, copper, cobalt, nickel, silver and manganese, on which is deposited at platinum group catalyst selected from the group consisting of platinum, palladium, rhodium and ruthenium, and including a metal chromic acid salt as part of the deposit on said substrate.

2. A filter for filtering air comprising a granulated porous substrate selected from the group consisting of activated charcoal, activated alumina, silica gel and zeolite, said substrate supporting a layer of an oxide of a metal selected from the group consisting of zinc, copper, cobalt, nickel, silver and manganese, on which is deposited a platinum group catalyst selected from the group consisting of platinum, palladium, rhodium and ruthenium, and including heavy metal chloride as part of the deposit on said substrate.

* * * * *